United States Patent Office 3,074,781
Patented Jan. 22, 1963

---

3,074,781
MANUFACTURE OF THIONYL FLUORIDE
Louis G. Anello, Parsippany, and Cyril Woolf, Morristown, N.J., assignors to Allied Chemical Corporation, New York, N.Y., a corporation of New York
No Drawing. Filed Dec. 23, 1960, Ser. No. 77,808
10 Claims. (Cl. 23—203)

This invention relates to processes for making thionyl fluoride, $SOF_2$, a known compound having a boiling point of about minus 43° C., and useful as an intermediate to make $SO_2F_2$, a well known fumigant, and as a reactant with carbon to form fluorocarbons.

It has been proposed to make thionyl fluoride by reaction of thionyl chloride and arsenic trifluoride, by reaction of $N_4S_4$ with HF, by oxidation of $S_2F_2$, and by reaction of thionyl chloride with antimony trifluoride in the presence of antimony pentachloride. Procedurally or costwise or both, the disadvantages of prior art proposals are such that none presents any commercial potentialities.

A major object of this invention is to provide a commercially practicable method for making thionyl fluoride.

In accordance with the present improvements, it has been found that the invention objectives may be accomplished by effecting certain controlled reactions of sulfur chloride with nitrosyl fluoride, NOF; or with nitrosyl fluoride-hydrogen fluoride complexes, namely, $NOF.3HF$ or $NOF.6HF$; or with mixtures of any two or all three.

Nitrosyl fluoride, NOF, is a known and available normally colorless gas material having a boiling point of about minus 56° C. Nitrosyl fluoride may be made, as known, by passing nitrosyl chloride over silver fluoride in a platinum tube at elevated temperatures, or by direct reaction of nitric oxide and elemental fluorine. The nitrosyl fluoride-hydrogen fluoride complexes, $NOF.3HF$ and $NOF.6HF$ or mixtures of these complexes, utilized as reactants in accordance with the present invention, may be made by reaction of nitrosyl chloride and anhydrous HF, for example as follows.

The reactor employed was an unpacked nickel tube 1" I.D. x 36" long mounted in an electrically heated furnace 30" long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel "Heliopak," and provided at the top with a reflux condenser cooled by a Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol) of a fraction boiling in the range of minus 5 to zero degrees C. and comprising mostly NOCl; about 86 gms. (4.3 mols) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and had a boiling point of about 68° C., and was liquid $NOF.6HF$ complex. The pot residue fraction on redistillation showed a boiling point of about 95° C., and was liquid $NOF.3HF$ complex. The $NOF.6HF$ complex pyrolyzes at about 77–81° C. to HF and $NOF.3HF$ complex. Hence, the mixture collected in the still after refluxing and at completion of the run as noted above, may be converted wholly to the $NOF.3HF$ complex by heating to say 90° C. Further, it will be understood that when the material is heated sufficiently to convert all of the same to vaporous form, all complex of the vapor is the $NOF.3HF$, i.e. at temperature above 95° C. (atmospheric pressure), all of the complex exists at $NOF.3HF$.

Nitrosyl fluoride may be available in liquid or gas form. The $NOF.3HF$ complex is usually initially in the form of a liquid which, if all $NOF.3HF$ complex, boils at about 95° C. The $NOF.6HF$ complex is usually initially in the form of a liquid which, if all $NOF.6HF$ complex, boils at about 68° C. The complexes, which may be represented by $NOF.xHF$ where $x$ is 3 or 6, may be available as liquid mixtures of such proportions that $x$ may vary within the limits of 3 to 6 inclusive.

Sulfur chlorides which may be employed as the source of sulfur comprise sulfur monochloride, $S_2Cl_2$, M.P. minus 80° C., B.P. plus 138° C.; sulfur dichloride, $SCl_2$, M.P. minus 78° C., B.P. 59° C. and sulfur tetrachloride, $SCl_4$, M.P. minus 31° C., B.P. minus 18° C. Unless otherwise indicated, the term "sulfur chloride" is intended to include any of the foregoing or mixtures of any of the same. Sulfur dichloride is the preferred sulfur containing starting material, commercially available sulfur dichloride usually being a mixture of about ⅓ $S_2Cl_2$ and ⅔ $SCl_2$.

All embodiments of the invention process involve reaction of sulfur chloride with nitrosyl fluoride material of the group consisting of NOF, $NOF.xHF$ complexes in which $x$ is 3 or 6, and mixtures of any two or all three. General practice of the invention process comprises subjecting sulfur chloride maintained substantially in the liquid phase to the action of nitrosyl fluoride in quantity and for a time sufficient to effect reaction of nitrosyl fluoride material with a substantial quantity of the sulfur chloride to form a substantial amount of thionyl fluoride, and recovering thionyl fluoride from the resulting reaction mixture.

Apparatus employed is relatively simple and may comprise a pot reactor equipped with suitable feed inlets, a gas outlet, an agitator, a thermowell, and facilities for selectively maintaining temperatures in the reactor in the range of about minus 50° C. up to say about plus 145° C., i.e. a little above the plus 138° C. boiling point of sulfur monochloride. The reactor gas exit may be connected to the gas inlet of a still equipped with an approximately minus 78° C. reflux head, temperature of which may be maintained by an acetone-Dry Ice mixture. The off-gas exit of the reflux head may be connected to a water scrubber to collect by-products such as HCl which boil below minus 78° C. and pass thru the minus 78° C. reflux head. During the course of the reaction between sulfur chloride and the nitrosyl fluoride material substantially all material in the reactor boiling at about minus 56° C. (the boiling point of nitrosyl fluoride) and higher are refluxed back into the reactor. On completion of reaction and refluxing, the sought-for thionyl fluoride product and other low boiling materials are distilled out of the reaction mixture. Hence, the apparatus includes facilities for distilling off low boilers and totally condensing the same in e.g. a minus 78° C. acetone-Dry Ice cold trap. The low boilers condensate, including the $SOF_2$, collected in the cold trap may be redistilled in any appropriate more or less conventional distilling equipment. Apparatus may be made of any suitable material, such as Monel, nickel and Inconel, which is corrosion resistant to reactants and products involved.

In representative practice, a reactor is initially charged with liquid sulfur chloride, and subsequently the nitrosyl fluoride material is fed in either as a gas or as a liquid. Nitrosyl fluoride, NOF per se, is usually introduced continuously as a gas, and if the nitrosyl fluoride material is fed as a complex or a mixture of complexes, the nitrosyl fluoride material is usually in liquid form. In accordance with the invention, it has been found that nitrosyl fluoride and the nitrosyl fluoride-hydrogen fluoride complexes commercially feasibly react with liquid sulfur chloride to form thionyl fluoride.

Investigations indicate that reaction takes place effectively throughout the entire temperature range in which the particular sulfur chloride employed is substantially all in the liquid phase. In all embodiments of the invention process, reaction zone temperatures, and pressures if other than atmospheric, are regulated so that substantially all of the sulfur chloride is maintained in liquid phase. More particularly, reaction zone temperatures are held in a range of a practicably few degrees C. higher than the melting point of the particular sulfur chloride, to a practicably few degrees C. lower than the boiling point of such chloride. However, temperatures of the reaction mixture in the reactor may vary rather wide depending upon the particular sulfur chloride. Reaction zone temperatures lower than about minus 25° C. afford no particular advantages with regard to any of the sulfur chlorides, and a low temperature value of about minus 25° C. provides for maintenance in the liquid phase of all of the chlorides including sulfur tetrachloride. In the case of sulfur monochloride, maximum reactor temperature should be about 130° C., and in the preferred practice using sulfur dichloride, maximum reaction zone temperature is about 50° C. Within the permissible liquid phase maintenance temperature ranges, depending upon the particular sulfur chloride, the upper portions of such temperature ranges are preferred, particularly near the end of any given reaction period, in order to promote completion of reaction. Toward the end of a given reaction, actual temperature in the reactor may be some appreciable number of degrees C. above the theoretical boiling point of the particular sulfur chloride starting material employed. For example, in the case of use of sulfur tetrachloride, the initial part of a given reaction may be carried out at a temperature below the minus 18° C. boiling point of $SCl_2$, and after the major portion of the reaction has taken place, temperature may be raised some several degrees C. up to say zero ° C., to facilitate completion of reaction, without causing any material change regarding the liquid phase condition existing in the reactor.

Relative amounts of sulfur chloride and nitrosyl fluoride or of the nitrosyl fluoride-hydrogen fluoride complexes usually correspond to at least stoichiometric values; that is, for each mol of $SCl_2$ or $SCl_4$, two mols of nitrosyl fluoride material, and for each mol of $S_2Cl_2$, four mols of nitrosyl fluoride material; all on basis of NOF constituent. Desirably, an excess of NOF constituent is used, and preferably in the range of about 5–50% mol excess over stoichiometric requirements. Larger NOF constituent excesses afford no particular advantage.

During and subsequent to addition to the reactor of the nitrosyl fluoride material, the resultant reaction mixture is maintained under reflux for a sufficient period of time to effect reaction of sulfur chloride with nitrosyl fluoride material to produce thionyl fluoride. The lowest boiling material in the system, except HCl, and traces of NO and $N_2O$, is nitrosyl fluoride per se, B.P. about minus 56° C. Hence, it is preferred to regulate refluxing so as to effect return to the reaction mixture of substantially all material which boils, at substantially atmospheric pressure at about minus 56° C. and higher. Practicably, during the reaction the reflux head should be held at temperature not higher than about minus 65° C., and as a matter of commercial convenience the reflux head is held at a temperature of about minus 78° C., the temperature of an acetone-Dry Ice mixture, a well known refrigerant. When the nitrosyl fluoride material is supplied to the reactor in the form of NOF, reaction products comprise $SOF_2$ and NOCl, and the vapors in the reflux column contain such compounds plus some unreacted NOF and probably some incidentally vaporized sulfur chloride. When the nitrosyl fluoride material is charged into the reactor in the form of any of the complexes, vapors in the column are substantially the same plus HCl and possibly some HF. The HCl and any trace amounts of NO or $N_2O$ present pass thru the reflux head, while all other materials are condensed and refluxed back to the reactor. The HCl is produced by reaction of HF of the NOF.xHF complex with by-product NOCl to form complex plus HCl. Reaction and refluxing time may be determined by technique known in carrying out reactions of the type described. For example, take-off of crude distillate may be initiated when temperature drop below the reflux head reaches a constant value. After take-off of some crude distillate, if desired the system may be returned to total reflux until there is again no further temperature drop below the reflux head. Depending upon particular apparatus, reactants and products, optimum reaction time may be determined by trial run.

On completion of the desired extent of reaction the reflux head on the still connected to the reactor is cut out of the system, and thereafter the low boiling materials in the reactor are distilled out, and the crude distillate is totally condensed as in a cold trap maintained at about minus 78° C. by means of an acetone-Dry Ice mixture. To facilitate the distillation and clean-up of reaction, material in the reactor may be warmed up to a temperature high enough to distill off the low boilers and minimize vaporization of any unreacted sulfur chloride which may be present in the reactor. During distillation, temperatures in the reactor in the range of about zero ° C. up to about 50° C. are satisfactory. The distillate vaporized out of the reactor is a crude mixture which may have an all-over boiling point range of minus 25° C. up to about plus 35° C. In the situation where the nitrosyl fluoride material has been supplied to the reaction in the form of NOF per se, the cold trap liquor resulting from total condensation of the low boilers distilled out of the reactor may contain $SOF_2$, NOCl, some unreacted NOF, and possibly some unreacted sulfur chloride. Where NOF constituents has been supplied to the reaction in the form of one or a mixture of the nitrosyl fluoride-hydrogen fluoride complexes, condensed liquor in the cold trap may contain the foregoing materials plus HF, and possibly some dissolved HCl.

The crude condensate may be then fractionally distilled in conventional apparatus to recover thionyl fluoride and any of the other compounds desired. In this fractionation operation, any nitrosyl fluoride present, B.P. minus 56° C., is distilled out as an initial fraction, and thereafter the sought-for thionyl fluoride, B.P. about minus 43° C. is recovered.

The following illustrate practice of the invention.

*Example 1*

Apparatus employed comprised a Monel pot reactor equipped with suitable feed inlets, a gas outlet, a stirrer, a thermowell and facilities for selectively maintaining temperatures in the reactor in the range of about minus 50° C. up to about plus 75° C. or more. The reactor gas exit was connected to the gas inlet of a Monel still equipped with an approximately minus 78° C. reflux head, temperature of which was maintained by an acetone-Dry Ice mixture. The off-gas outlet of the reflux head was connected to a water scrubber. The reactor was initially charged with 106 g. (1.0 mol) of liquid sulfur dichloride into which was fed about 71 g. (1.0 mol) of $Cl_2$. During introduction of the latter, temperature in the reactor was maintained at about minus 30° C., and the resultant material in the reactor was sulfur tetrachloride, $SCl_4$, in liquid form. Over a period of about 2.5 hrs. there were fed into the reactor about 390 g. (2.6 mols, basis NOF constituent) of a liquid mixture of NOF.6HF, B.P. about 68° C., and NOF.3HF, B.P. 95° C. Proportioning of the latter two complexes was such that the mixture corresponded to approximately

NOF.4HF

At the start of feed of the NOF–HF complex, temperature in the reactor was about minus 20° C. to prevent any significant decomposition of $SCl_4$ to $SCl_2$ and chlorine. Temperature was gradually increased up to zero ° C. at the end of the 2.5 hr. period, at which time reflux temperature, below the minus 78° C. reflux head of the still, had dropped to about minus 20° C. During the 2.5 hr. period the off-gas of the reflux head was passed into and thru the water scrubber. At the end of the 2.5 hr. complex feed and refluxing period, temperature in the reactor was slowly increased to about 40° C. for about a 3 hr. period. During the latter three hour period the off-gas of the reactor was totally condensed in an acetone-Dry Ice trap, and there were recovered about 41 g. of a mixture boiling in the range of about minus 20° C. up to about zero ° C. On fractional distillation there were recovered from the latter mixture about 17 gms. of a fraction boiling in the range of minus 44 to minus 38° C. identified by means of infrared spectrum analysis and molecular weight determination to be $SOF_2$; about 6 g. of an intermediate fraction boiling in the range of minus 38° C. to minus 15° C.; and about 18 g. of NOCl residual material boiling in the range of about minus 15° C. to minus 5° C. About 328 g. of unreacted $SCl_2$ and NOF—HF complex remained in the reactor, and there were recovered from the water scrubber about 1.6 mols of HCl.

*Example 2*

Apparatus employed was substantially the same as in Example 1. The reactor was charged with about 103 g. (1.0 mol) of liquid $SCl_2$, to which were added about 300 g. (2.15 mols, basis NOF constituent) of liquid NOF—HF complex of substantially the same composition as in Example 1. During addition of the NOF—HF complex, material in the reactor was maintained at temperature of about minus 10° C. Over a period of about 3 hrs. contents of the reactor were slowly warmed up to about 30° C. during which time some HCl colored with NO was evolved and passed thru the minus 78° C. reflux head and into the water scrubber. At the end of the 3 hour refluxing period, reflux temperature, below the minus 78° C. reflux head of the still, dropped to about minus 7° C. Thereafter, all of the off-gas of the reactor was totally condensed in an acetone-Dry Ice trap, and there were recovered about 44 g. of a mixture boiling in the range of about minus 7° C. up to about plus 30° C. About 312 g. of unreacted $SCl_2$ and NOF—HF complex remained in the reactor, and absorbed in the water scrubber were about 0.61 mol of HCl. The low-boiling 44 g. material was fractionally distilled in an evacuated glass still packed with nickel helices, and there were recovered about 15 g. of a fraction boiling in the range of minus 46° C. up to minus 40° C., identified as in Example 1 as $SOF_2$; about 4 g. of an intermediate fraction boiling in the range of about minus 40° C. up to about minus 7° C.; and about 51 g. (0.44 mol) of NOCl boiling in the range of about minus 7° C. up to about minus 5° C.; and about 5 g. of still residue.

*Example 3*

Apparatus employed was substantially the same as in Example 1. The reactor was initially charged with about 206 g. (2 mols) of liquid $SCl_2$ which was heated in the reactor to about 50° C. During about an 8 hr. period, about 108 g. (2.2 mols) of nitrosyl fluoride gas (NOF, B.P. minus 56° C.) were bubbled into the reactor. At the end of the 8 hr. refluxing period reflux temperature, below the minus 78° C. reflux head of the still connected to the reactor, dropped to about minus 23° C. Thereafter, the reactor was warmed up to about 45–50° C., and all off-gas was totally condensed in an acetone-Dry Ice trap in which there were recovered about 172 g. of a mixture boiling in the range of about minus 23° C. up to about zero ° C. About 110 g. of unreacted $SCl_2$ remained in the reactor. The 172 g. of low-boiling material were redistilled in a glass still packed with nickel helices, and there were recovered about 34 g. of material boiling in the range of about minus 43° C. up to about minus 35° C., identified as above as substantially all $SOF_2$. The remaining low boilers consisted of about 94 g. NOCl and 41 g. $SCl_2$.

The herein outlined method of making NOF.3HF and NOF.6HF complexes from nitrosyl chloride and HF, is more fully described and claimed in our copending application Serial No. 77,805, filed December 23, 1960.

We claim:

1. The process for making thionyl fluoride ($SOF_2$) which comprises subjecting sulfur chloride maintained substantially in liquid phase to the action of nitrosyl fluoride material—of the group consisting of NOF, NOF.$x$HF complexes in which $x$ is 3 or 6, and mixtures thereof—in quantity and for a time sufficient to effect reaction of nitrosyl fluoride material with sulfur chloride to form thionyl fluoride, and recovering thionyl fluoride from the resulting reaction mixture.

2. The process of claim 1 in which the reaction mixture is maintained at temperature substantially in the range of minus 25° C.–plus 130° C.

3. The process of claim 1 in which the sulfur chloride is $SCl_2$, and the reaction mixture is maintained substantially in the range of minus 25° C. and plus 50° C.

4. The process of claim 1 in which the nitrosyl fluoride material is NOF.

5. The process for making thionyl fluoride ($SOF_2$) by reaction of sulfur chloride and nitrosyl fluoride material of the group consisting of NOF, NOF.$x$HF complexes in which $x$ is 3 or 6, and mixtures thereof, which process comprises providing a body of liquid sulfur chloride and thereafter maintaining said sulfur chloride substantially in the liquid phase, introducing nitrosyl fluoride material into said body, maintaining the resultant reaction mixture at temperature substantially in the range of minus 25° C.–plus 130° C. and under reflux for a sufficient period of time to effect reaction of sulfur chloride with nitrosyl fluoride material to produce thionyl fluoride, separating the latter from the refluxed reaction mixture, and recovering thionyl fluoride.

6. The process of claim 5 in which the reaction mixture is maintained at temperature substantially in the range of minus 25° C.–plus 50° C.

7. The process of claim 5 in which refluxing is effected so as to return to the reaction mixture substantially all material boiling not lower than about minus 56° C. at substantially atmospheric pressure.

8. The process of claim 5 in which the sulfur chloride is $SCl_2$.

9. The process of claim 5 in which the nitrosyl fluoride material is NOF.

10. The process for making thionyl fluoride by reaction of $SCl_2$ and NOF which process comprises providing a body of liquid $SCl_2$ and thereafter maintaining the same substantially in the liquid phase at temperature substantially in the range of minus 25° C.–plus 50° C., introducing gaseous NOF into said body, maintaining the resultant mixture under a reflux head, held at temperature substantially that of an acetone-Dry Ice mixture, for a sufficient length of time to effect reaction of sulfur chloride with nitrosyl fluoride material to produce thionyl fluoride, thereafter distilling thionyl fluoride out of the refluxed reaction mixture, and recovering thionyl fluoride from the resulting distillate.

References Cited in the file of this patent

UNITED STATES PATENTS 2,907,636   Smith ---------------- Sept. 29, 1961

OTHER REFERENCES

Martin: "Fluorination of Volatile Inorganic Compounds," Inorganic Syntheses, Bailar, vol. IV, page 136, McGraw-Hill, 1953.

Burg: "Volatile Inorganic Fluorides," Fluorine Chemistry, vol. I, Simons, page 89, Academic Press Inc., publishers.

Brown et al.: "Preparation and Some Physical Properties of Sulphur Tetrafluoride," Journal Chemical Soc., London, 1955; page 3147.